(12) United States Patent
Ni

(10) Patent No.: US 9,985,878 B2
(45) Date of Patent: May 29, 2018

(54) PROCESSING RULE MODIFICATION METHOD, APPARATUS AND DEVICE

(71) Applicant: Huawei Technologies Co., Ltd., Shenzhen (CN)

(72) Inventor: Hui Ni, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 123 days.

(21) Appl. No.: 15/222,777

(22) Filed: Jul. 28, 2016

(65) Prior Publication Data

US 2016/0337250 A1 Nov. 17, 2016

Related U.S. Application Data

(63) Continuation of application No. PCT/CN2014/071609, filed on Jan. 28, 2014.

(51) Int. Cl.
*H04L 12/721* (2013.01)
*H04L 12/54* (2013.01)
(Continued)

(52) U.S. Cl.
CPC .......... *H04L 45/38* (2013.01); *G06Q 10/06* (2013.01); *H04L 12/56* (2013.01); *H04L 41/083* (2013.01);
(Continued)

(58) Field of Classification Search
CPC ..... H04L 47/2441; H04L 45/30; H04L 47/17; H04L 63/04; H04L 63/1458; H04L 12/56; H04L 45/38; H04L 67/327
See application file for complete search history.

(56) References Cited

U.S. PATENT DOCUMENTS 5,740,533 A * 4/1998 Lin .................. H04W 88/187
340/7.42
7,720,055 B2 * 5/2010 Kadambi ............... H04L 47/50
370/389
(Continued)

FOREIGN PATENT DOCUMENTS

CN 102946325 A 2/2013
CN 103051629 A 4/2013
(Continued)

OTHER PUBLICATIONS

OpenFlow Switch Specification, Version 1.4.0 (Wire Protocol 0x05), ONF TS-012, Open Networking Foundation, Oct. 14, 2013, 206 pages.

*Primary Examiner* — Raj Jain
(74) *Attorney, Agent, or Firm* — Slater Matsil, LLP

(57) ABSTRACT

Various embodiments provide a method including receiving, by a forwarder, rule modification information sent by a controller. The rule modification information includes rule description match information and action instruction modification information. The rule description match information is used to determine a to-be-modified processing rule. Rule description information of the to-be-modified processing rule accords with the rule description match information, and the action instruction modification information is used to instruct to modify an action instruction specified in an instruction set of the to-be-modified processing rule. The method also includes modifying, by the forwarder, when the forwarder determines that rule description information of a first processing rule meets the rule description match information, an action instruction specified in an instruction set of the first processing rule according to the action instruction modification information.

20 Claims, 4 Drawing Sheets

(51) Int. Cl.
  *G06Q 10/06* (2012.01)
  *H04L 12/851* (2013.01)
  *H04L 12/931* (2013.01)
  *H04L 29/06* (2006.01)
  *H04L 12/24* (2006.01)

(52) U.S. Cl.
  CPC .......... *H04L 41/0816* (2013.01); *H04L 47/24* (2013.01); *H04L 49/70* (2013.01); *H04L 69/22* (2013.01); *H04L 41/0893* (2013.01)

(56) References Cited

U.S. PATENT DOCUMENTS

| | | | |
|---|---|---|---|
| 2005/0226235 A1* | 10/2005 | Kumar | H04L 29/06 370/386 |
| 2008/0256095 A1* | 10/2008 | Wakefield | H04L 61/1517 |
| 2009/0125459 A1 | 5/2009 | Norton et al. | |
| 2011/0317701 A1 | 12/2011 | Yamato et al. | |
| 2012/0110656 A1 | 5/2012 | Santos et al. | |
| 2013/0088967 A1 | 4/2013 | Kusumoto | |
| 2014/0086255 A1* | 3/2014 | Gooch | H04L 47/17 370/401 |
| 2016/0099868 A1* | 4/2016 | Tan | H04L 12/6418 370/392 |

FOREIGN PATENT DOCUMENTS

| | | |
|---|---|---|
| CN | 103428094 A | 12/2013 |
| EP | 2482495 A1 | 8/2012 |

* cited by examiner

PROCESSING RULE MODIFICATION METHOD, APPARATUS AND DEVICE

CROSS-REFERENCE TO RELATED APPLICATIONS

This application is a continuation of International Application No. PCT/CN2014/071609, filed on Jan. 28, 2014, which is hereby incorporated by reference in its entirety.

TECHNICAL FIELD

The present disclosure relates to the communications field, and in particular embodiments, to a processing rule modification method, apparatus, and device.

BACKGROUND

To implement deployment flexibility and manageability of network elements, the industry proposes a software-defined networking (SDN) concept. SDN decouples control logic of the network elements from their forwarding functions, and deploys the control logic of all the network elements in a centralized manner, so that control and maintenance work of a network can be simply implemented by performing an operation on a control plane device. Therefore, management efficiency of the network is increased, a forwarding plane device is simpler, and high performance and reusability of the forwarding plane device can be easily achieved.

In actual application, an SDN network generally includes a controller that functions as a control plane device and a forwarder that functions as a forwarding plane device. The controller uses processing rules of the forwarder to perform control on a data packet processing process. Each processing rule includes match field information and an instruction set including one or more action instructions. The match field information is used to determine a to-be-matched data packet, that is, a data packet corresponding to the processing rule. The instruction set is used to instruct to perform, according to an action instruction in the instruction set, processing on the data packet corresponding to the processing rule. Each action instruction optionally includes an action type and an action parameter. The action type and the action parameter are collectively referred to as an action variable of an action instruction in the present disclosure. Usually, the processing rule may further include an identifier or an index of the processing rule. The match field information of the processing rule and the identifier or index of the processing rule may be referred to as rule description information of the processing rule. The rule description information of the processing rule may be used to identify the processing rule. It should be noted that, the rule description information being used to identify the processing rule does not necessarily mean uniquely identifying a processing rule. Different processing rules may have same rule description information.

The OpenFlow protocol is a most typical and most widely applied protocol in an SDN network. Network elements in the OpenFlow protocol include an OpenFlow controller and an OpenFlow forwarder (Openflow Switch), which are respectively referred to as an OF controller and an OF forwarder for short below. Data packet processing in the OpenFlow protocol is performed based on a service flow granularity. Each service flow may be represented by a combination of different packet header fields, such as a source Media Access Control (MAC) address, a destination MAC address, a source Internet Protocol (IP) address, a destination IP address, a source port number, and a destination port number. The OF forwarder stores a processing rule of the flow granularities in a flow table of the OF forwarder. Therefore, a processing rule in the OpenFlow protocol is also referred to as a flow entry. The following Table 1 shows a structure of each flow entry.

TABLE 1

| Match Field | Priority | Counter | Instructions | Timeout | Cookie |
| --- | --- | --- | --- | --- | --- |

Each flow entry includes a match field, a priority, a counter, an instruction set, a timeout, a cookie, and the like. The match field may be considered as rule description information of the flow entry. The instruction set includes an action instruction corresponding to the flow entry. An action variable of each action instruction includes an action type and an action parameter. In this case, the rule description information may further be used to determine a data packet corresponding to the processing rule, and the data packet corresponding to the processing rule accords with the rule description information.

When the OF forwarder receives a data packet of a user, the OF forwarder matches the data packet with a match field of each flow entry. The OF forwarder then performs, according to a successfully matched flow entry, an action included in an instruction set on the data packet. In this way, forwarding, modification, and other control processing of the data packet are implemented.

The OpenFlow protocol uses a flow modification (Flow_mod) message for addition, modification, and deletion of a flow entry. A main structure of each Flow_mod message is as follows: Flow_mod={message type (MsgType), table ID, match rule, Instructions (Action 1, Action 2, . . . Action n)}. When a flow entry is being modified, the Flow_mod message includes an identifier that Msg_Type is Modify or Modify_Strict to respectively indicate non-strict match modification and strict match modification on the flow entry. Strict match modification is to change an instruction set of a flow entry whose match field is completely the same as a match rule carried in a Flow_mod message to an instruction set carried in the Flow_mod message. Non-strict match modification is to change instruction sets of all flow entries whose match fields are covered by a match rule carried in a Flow_mod message to an instruction set carried in the Flow_mod message. A difference between the two types of modification is illustrated below.

For the following three flow entries stored in a flow table (the following examples and embodiments to be described provide only some content of flow entries related to this disclosure, and other fields, such as timeouts and cookie, are irrelevant to the present disclosure and are not listed herein):

flow entry 1: match rule (Match rule) (src_ip=ip1, dst_ip=ip2, protocol=TCP, dst_port=80), instructions (action1, action4);

flow entry 2: Match rule (src_ip=ip1, dst_ip=ip2, protocol=UDP, dst_port=53), instructions (action2, action4); and flow entry 3: Match rule (src_ip=ip1, dst_ip=ip2), instructions (action3, action4).

It is assumed that information carried in a Flow_mod message is: Msg_type, match rule (src_ip=ip1, dst_ip=ip2), instructions (action4, action5). If Msg_Type carried in the Flow_mod message is Modify_Strict, instructions in the flow entry 3 are replaced with instructions (action4, action5) because only the flow entry 3 completely matches the match rule carried in the Flow_mod message; if Msg_Type carried in the Flow_mod message is Modify, instructions in the flow entries 1, 2, and 3 are all replaced with instructions (action4, action5) because the match rule in the Flow_mod message is included in all the flow entries 1, 2, and 3.

It can be learned from the foregoing description and examples that one or more flow entries can be modified in batches by means of strict match modification or non-strict match modification in a flow entry modification method defined in the OpenFlow protocol. However, the modification is limited only to complete replacement of an original instruction set of a flow entry with an instruction set carried in a Flow_mod message.

This modification method is excessively inflexible, leads to low modification efficiency in most cases, and occupies more communication resources between an OF controller and an OF forwarder.

SUMMARY

Embodiments provide a processing rule modification method, apparatus and device, which can increase efficiency in modifying a processing rule in a forwarder, and reduce occupied communication resources between a controller and the forwarder.

According to a first aspect, a processing rule modification apparatus is provided. The modification apparatus stores a first processing rule, where the first processing rule includes rule description information and an instruction set. The rule description information is used to identify the first processing rule. The instruction set includes at least one action instruction. The instruction set is used to instruct to perform, according to the action instruction in the instruction set, processing on a data packet corresponding to the first processing rule. The apparatus includes a receiving unit configured to receive rule modification information sent by a controller. The rule modification information includes rule description match information and action instruction modification information, where the rule description match information is used to determine a to-be-modified processing rule. Rule description information of the to-be-modified processing rule accords with the rule description match information, and the action instruction modification information is used to instruct to modify an action instruction specified in an instruction set of the to-be-modified processing rule. The apparatus also includes a modification unit, configured to modify an action instruction specified in the instruction set of the first processing rule according to the action instruction modification information received by the receiving unit, when it is determined that the rule description information of the first processing rule accords with the rule description match information received by the receiving unit.

With reference to the first aspect, in a first possible implementation manner of the first aspect, the action instruction modification information includes an action instruction match condition and modification operation information, where the action instruction match condition is used to determine a to-be-modified action instruction, and the modification operation information is used to indicate a modification operation on the to-be-modified action instruction. The modification unit includes an instruction determining subunit configured to determine a first action instruction to be modified in the instruction set of the first processing rule according to the action instruction match condition when it is determined that the rule description information of the first processing rule accords with the rule description match information received by the receiving unit. The modification unit also includes a modification subunit configured to modify the first action instruction according to the modification operation information.

With reference to the first possible implementation manner of the first aspect, in a second possible implementation manner of the first aspect, the action instruction match condition includes location information, and the location information is used to indicate a location of the to-be-modified action instruction in the instruction set of the to-be-modified processing rule. The instruction determining subunit is configured to determine the first action instruction according to the location information when it is determined that the rule description information of the first processing rule accords with the rule description match information received by the receiving unit.

With reference to the second possible implementation manner of the first aspect, in a third possible implementation manner of the first aspect, the location information includes a first mask, and a location of each mask bit in the first mask corresponds to a location of each action instruction in the instruction set of the to-be-modified processing rule. The instruction determining subunit is configured to determine a mask bit being a preset value from the first mask; and determine the first action instruction according to a location of the mask bit being the preset value when it is determined that the rule description information of the first processing rule accords with the rule description match information received by the receiving unit.

With reference to the second possible implementation manner of the first aspect, in a fourth possible implementation manner of the first aspect, the location information includes a modification indication list, the modification indication list includes a modification indication, and a location of each modification indication in the modification indication list corresponds to a location of each action instruction in the instruction set of the to-be-modified processing rule, where the modification indication is used to indicate whether to modify the action instruction. The instruction determining subunit is configured to, when it is determined that the rule description information of the first processing rule accords with the rule description match information received by the receiving unit, determine a modification indication that is used to indicate action instruction modification. The instruction determining subunit is also configured to determine, according to a first location of the modification indication that is used to indicate action instruction modification in the modification indication list, the first action instruction corresponding to the first location.

With reference to the first possible implementation manner of the first aspect, in a fifth possible implementation manner of the first aspect, the action instruction match condition includes instruction type information, and the instruction type information is used to indicate an instruction type of the to-be-modified action instruction. The instruction determining subunit is configured to determine the first action instruction according to the instruction type information when it is determined that the rule description information of the first processing rule accords with the rule description match information received by the receiving unit.

With reference to the first possible implementation manner of the first aspect, and/or the second possible implementation manner of the first aspect, and/or the third possible implementation manner of the first aspect, and/or the fourth possible implementation manner of the first aspect, and/or the fifth possible implementation manner of the first aspect, in a sixth possible implementation manner of the first aspect, the modification operation information includes a new action instruction. The modification subunit is configured to change the first action instruction to the new action instruction.

With reference to the first possible implementation manner of the first aspect, and/or the second possible implementation manner of the first aspect, and/or the third possible implementation manner of the first aspect, and/or the fourth possible implementation manner of the first aspect, and/or the fifth possible implementation manner of the first aspect, in a seventh possible implementation manner of the first aspect, the modification operation information includes parameter modification indication information, and the parameter modification indication information is used to instruct to modify an action variable of the to-be-modified action instruction. The modification subunit is configured to modify an action variable of the first action instruction according to the parameter modification indication information.

With reference to the seventh possible implementation manner of the first aspect, in an eighth possible implementation manner of the first aspect, the parameter modification indication information includes a parameter match condition and parameter modification operation information, where the parameter match condition is used to determine the to-be-modified action variable in the to-be-modified action instruction, and the parameter modification operation information is used to instruct to modify the to-be-modified action variable. The modification subunit includes a determining module, configured to determine a first action variable to be modified in the first action instruction according to the parameter match condition; and a modification module, configured to modify the first action variable according to the parameter modification operation information.

With reference to the eighth possible implementation manner of the first aspect, in a ninth possible implementation manner of the first aspect, the parameter modification operation information includes a new variable value. The modification module is configured to change a variable value of the first action variable to the new variable value.

With reference to the eighth possible implementation manner of the first aspect, in a tenth possible implementation manner of the first aspect, the parameter modification operation information includes operational method information, and the operational method information is used to indicate an operational method for obtaining a variable value. The modification module is configured to obtain a new variable value according to the operational method information; and change a variable value of the first action variable to the new variable value.

According to a second aspect, a processing rule modification apparatus is provided, where the apparatus is applicable to a controller that communicates with a forwarder, where the forwarder stores a first processing rule, the first processing rule includes rule description information and an instruction set, the rule description information is used to identify the first processing rule, the instruction set includes at least one action instruction, the instruction set is used to instruct to perform, according to the action instruction in the instruction set, processing on a data packet corresponding to the first processing rule. The apparatus includes a generation unit, configured to generate rule modification information. The apparatus also includes a sending unit configured to send, to the forwarder, the rule modification information generated by the generation unit. The rule modification information includes rule description match information and action instruction modification information. The rule description match information is used to determine a to-be-modified processing rule. Rule description information of the to-be-modified processing rule accords with the rule description match information, and the action instruction modification information is used to instruct to modify an action instruction specified in an instruction set of the to-be-modified processing rule, so that when the forwarder determines that the rule description information of the first processing rule accords with the rule description match information, the forwarder modifies an action instruction specified in the instruction set of the first processing rule according to the action instruction modification information.

According to a third aspect, a processing rule modification method is provided, where the method is applicable to a forwarder, where the forwarder stores a first processing rule, the first processing rule includes rule description information and an instruction set, the rule description information is used to identify the first processing rule, the instruction set includes at least one action instruction, the instruction set is used to instruct to perform, according to the action instruction in the instruction set, processing on a data packet corresponding to the first processing rule. The method includes receiving, by the forwarder, rule modification information sent by a controller. The rule modification information includes rule description match information and action instruction modification information. The rule description match information is used to determine a to-be-modified processing rule. Rule description information of the to-be-modified processing rule accords with the rule description match information. The action instruction modification information is used to instruct to modify an action instruction specified in an instruction set of the to-be-modified processing rule. The method also includes modifying, by the forwarder, an action instruction specified in the instruction set of the first processing rule according to the action instruction modification information when the forwarder determines that the rule description information of the first processing rule accords with the rule description match information.

With reference to the third aspect, in a first possible implementation manner of the third aspect, the action instruction modification information includes an action instruction match condition and modification operation information, where the action instruction match condition is used to determine a to-be-modified action instruction, and the modification operation information is used to indicate a modification operation on the to-be-modified action instruction. The modifying, by the forwarder, an action instruction specified in the instruction set of the first processing rule according to the action instruction modification information includes determining, by the forwarder, a first action instruction to be modified in the instruction set of the first processing rule according to the action instruction match condition; and modifying, by the forwarder, the first action instruction according to the modification operation information.

With reference to the first possible implementation manner of the third aspect, in a second possible implementation manner of the third aspect, the action instruction match condition includes location information, and the location information is used to indicate a location of the to-be-modified action instruction in the instruction set of the to-be-modified processing rule. The determining, by the forwarder, a first action instruction to be modified in the instruction set of the first processing rule according to the action instruction match condition includes determining, by the forwarder, the first action instruction according to the location information.

With reference to the second possible implementation manner of the third aspect, in a third possible implementation manner of the third aspect, the location information includes a first mask, and a location of each mask bit in the first mask corresponds to a location of each action instruction in the instruction set of the to-be-modified processing rule. The determining, by the forwarder, the first action instruction according to the location information includes determining, by the forwarder, a mask bit being a preset value from the first mask; and determining, by the forwarder, the first action instruction according to a location of the mask bit being the preset value.

With reference to the second possible implementation manner of the third aspect, in a fourth possible implementation manner of the third aspect, the location information includes a modification indication list, the modification indication list includes a modification indication, and a location of each modification indication in the modification indication list corresponds to a location of each action instruction in the instruction set of the to-be-modified processing rule, where the modification indication is used to indicate whether to modify the action instruction. The determining, by the forwarder, the first action instruction according to the location information includes determining, by the forwarder, a modification indication that is used to indicate action instruction modification in the modification indication list, and determining, by the forwarder according to a first location of the modification indication that is used to indicate action instruction modification in the modification indication list, the first action instruction.

With reference to the first possible implementation manner of the third aspect, in a fifth possible implementation manner of the third aspect, the action instruction match condition includes instruction type information, and the instruction type information is used to indicate an instruction type of the to-be-modified action instruction. The determining, by the forwarder, a first action instruction to be modified in the instruction set of the first processing rule according to the action instruction match condition includes determining, by the forwarder, the first action instruction according to the instruction type information.

With reference to the first possible implementation manner of the third aspect, and/or the second possible implementation manner of the third aspect, and/or the third possible implementation manner of the third aspect, and/or the fourth possible implementation manner of the third aspect, and/or the fifth possible implementation manner of the third aspect, in a sixth possible implementation manner of the third aspect, the modification operation information includes a new action instruction. The modifying, by the forwarder, the first action instruction according to the modification operation information includes changing, by the forwarder, the first action instruction to the new action instruction.

With reference to the first possible implementation manner of the third aspect, and/or the second possible implementation manner of the third aspect, and/or the third possible implementation manner of the third aspect, and/or the fourth possible implementation manner of the third aspect, and/or the fifth possible implementation manner of the third aspect, in a seventh possible implementation manner of the third aspect, the modification operation information includes parameter modification indication information, and the parameter modification indication information is used to instruct to modify an action variable of the to-be-modified action instruction. The modifying, by the forwarder, the first action instruction according to the modification operation information includes modifying, by the forwarder, an action variable of the first action instruction according to the parameter modification indication information.

With reference to the seventh possible implementation manner of the third aspect, in an eighth possible implementation manner of the third aspect, the parameter modification indication information includes a parameter match condition and parameter modification operation information, where the parameter match condition is used to determine the to-be-modified action variable in the to-be-modified action instruction, and the parameter modification operation information is used to instruct to modify the to-be-modified action variable. The modifying, by the forwarder, an action variable of the first action instruction according to the parameter modification indication information includes determining, by the forwarder, a first action variable to be modified in the first action instruction according to the parameter match condition; and modifying, by the forwarder, the first action variable according to the parameter modification operation information.

With reference to the eighth possible implementation manner of the third aspect, in a ninth possible implementation manner of the third aspect, the parameter modification operation information includes a new variable value. The modifying, by the forwarder, the first action variable according to the parameter modification operation information includes changing, by the forwarder, a variable value of the first action variable to the new variable value.

With reference to the eighth possible implementation manner of the third aspect, in a tenth possible implementation manner of the third aspect, the parameter modification operation information includes operational method information, and the operational method information is used to indicate an operational method for obtaining a variable value. The modifying, by the forwarder, the first action variable according to the parameter modification operation information includes obtaining, by the forwarder, a new variable value according to the operational method information; and changing, by the forwarder, a variable value of the first action variable to the new variable value.

According to a fourth aspect, a processing rule modification method is provided, where the method is applicable to a controller that communicates with a forwarder, where the forwarder stores a first processing rule, the first processing rule includes rule description information and an instruction set, the rule description information is used to identify the first processing rule, the instruction set includes at least one action instruction, the instruction set is used to instruct to perform, according to the action instruction in the instruction set, processing on a data packet corresponding to the first processing rule. The method includes sending, by the controller to the forwarder, rule modification information. The rule modification information includes rule description match information and action instruction modification information. The rule description match information is used to determine a to-be-modified processing rule. Rule description information of the to-be-modified processing rule accords with the rule description match information, and the action instruction modification information is used to instruct to modify an action instruction specified in an instruction set of the to-be-modified processing rule, so that when the forwarder determines that the rule description information of the first processing rule accords with the rule description match information, the forwarder modifies an action instruction specified in the instruction set of the first processing rule according to the action instruction modification information.

In the embodiments, a forwarder receives rule modification information sent by a controller. The rule modification information includes rule description match information and action instruction modification information. The rule description match information is used to determine a to-be-modified processing rule. Rule description information of the to-be-modified processing rule accords with the rule description match information, and the action instruction modification information is used to instruct to modify an action instruction specified in an instruction set of the to-be-modified processing rule. When the forwarder determines that rule description information of a first processing rule accords with the rule description match information, the forwarder modifies an action instruction specified in an instruction set of the first processing rule according to the action instruction modification information. Therefore, the forwarder no longer implements modification of the first processing rule only by using a manner similar to a manner in which an instruction set carried in a Flow_mod message is used to completely replace an original instruction set of a flow entry. Instead, the forwarder can separately modify a specified action and/or a specified action variable of the first processing rule. This manner of modifying the first processing rule is flexible, and increases efficiency in modifying the first processing rule in the forwarder by the controller. In addition, in a scenario in which only some action instructions need to be modified in the instruction set of the first processing rule, compared with the prior art, this manner can compete modification of the action instructions in the instruction set of the first processing rule by using relatively fewer messages. Compared with the prior art, this manner reduces a quantity of messages used for modifying the first processing rule, and therefore reduces occupied communication resources between the controller and the forwarder.

BRIEF DESCRIPTION OF THE DRAWINGS

To describe the technical solutions in the embodiments more clearly, the following briefly describes the accompanying drawings required for describing the embodiments or the prior art. Apparently, the accompanying drawings in the following description show merely some embodiments, and a person of ordinary skill in the art may still derive other drawings from these accompanying drawings without creative efforts.

DETAILED DESCRIPTION OF ILLUSTRATIVE EMBODIMENTS

Figure 1:
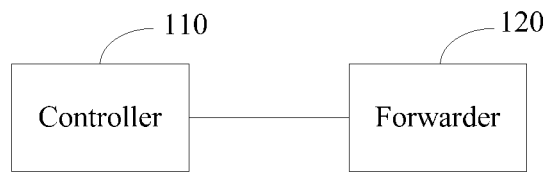
FIG. 1 is a diagram of a structure of an application scenario of a processing rule modification method according to an embodiment.

In some scenarios, some action instructions in an instruction set of a flow entry are supported only by the flow entry, or in many scenarios only some action instructions in an instruction set of a flow entry actually need to be modified. Therefore, an OF controller expects to modify some action instructions in an instruction set of a flow entry in batches, and retains other action instructions in the instruction set of the flow entry at the same time. For example, for the flow entries 1 to 3 exemplified in the Background section, it is assumed that the actions 1, 2, and 3 indicate actions of encapsulating data packets to different tunnels corresponding to the flow entries, the action 4 indicates forwarding a data packet from a port 1, and the action 5 indicates forwarding a data packet from a port 2. The OF controller expects to modify the action 4 in each of the flow entries 1, 2, and 3 to the action 5 while retaining the actions 1, 2, and 3 unchanged, so that a port that lastly forwards a data packet changes from the port 1 to the port 2. However, the OF controller cannot implement this batch modification capability by using one Flow_mod message in the prior art because the prior art supports only complete replacement of an instruction set of a flow entry. The OF controller can only modify three processing rules by using three Flow_mod messages respectively, which leads to low efficiency in modifying a flow entry in a forwarder. In addition, three Flow_mod messages are required to implement modification of the flow entries 1 to 3, which occupies communication resources between the OF controller and an OF forwarder. Especially in a scenario in which the OF forwarder has a large quantity of flow entries, this inefficient flow entry modification may cause transmission of a large quantity of Flow_mod messages between the OF controller and the OF forwarder, decreasing efficiency in modifying the flow entries, and consuming the communication resources between the OF controller and the OF forwarder.

In view of this, embodiments provide a processing rule modification method, apparatus and device, which can increase efficiency in modifying a processing rule in a forwarder, and reduce occupied communication resources between a controller and the forwarder.

The processing rule modification method, apparatus and device provided in the embodiments may not only be applicable to modifying a flow entry in an OF forwarder by an OF controller in the OpenFlow protocol, but also be applicable to modifying a processing rule in a forwarder by a controller in another SDN network.

Referring to FIG. 1, FIG. 1 is a schematic diagram of a structure of an SDN network to which a processing rule modification method according to an embodiment is applicable. The structure includes a controller 110 and a forwarder 120. The controller 110 modifies first processing rules stored in the forwarder 120 by sending rule modification information to the forwarder 120. The first processing rules stored in the forwarder 120 and the foregoing processing rule refer to a same object. The processing rules stored in the forwarder 120 mentioned herein and below are referred to as first processing rules, so as to distinguish the first processing rule from a to-be-modified processing rule. Specifically, the first processing rule may include rule description information and an instruction set, the rule description information is used to identify the first processing rule, the instruction set includes at least one action instruction, and the instruction set is used to instruct to perform, according to the action instruction in the instruction set, processing on a data packet corresponding to the first processing rule.

Figure 2:
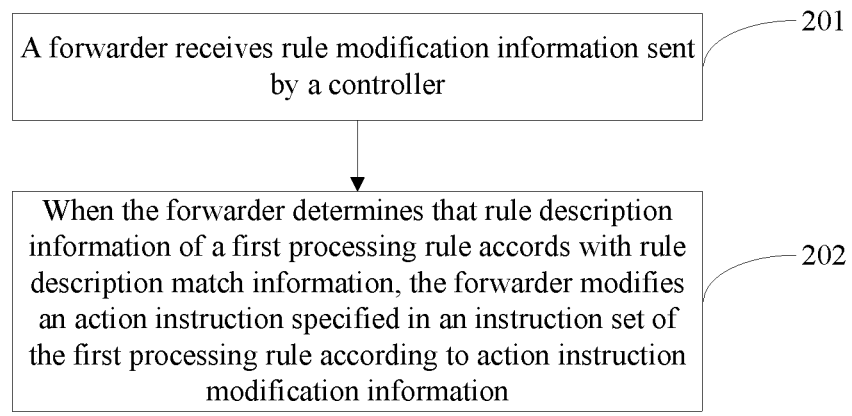
FIG. 2 is a schematic diagram of a first embodiment of a processing rule modification method.

Referring to FIG. 2, FIG. 2 is a schematic diagram of a first embodiment of a processing rule modification method. The method includes the following.

Step 201: A forwarder receives rule modification information sent by a controller, where the rule modification information includes rule description match information and action instruction modification information. The rule description match information is used to determine a to-be-modified processing rule. Rule description information of the to-be-modified processing rule accords with the rule description match information. The action instruction modification information is used to instruct to modify an action instruction specified in an instruction set of the to-be-modified processing rule.

Step 202: When the forwarder determines that rule description information of a first processing rule accords with the rule description match information, the forwarder modifies an action instruction specified in an instruction set of the first processing rule according to the action instruction modification information.

In this embodiment, a forwarder receives rule modification information sent by a controller. The rule modification information includes rule description match information and action instruction modification information. The rule description match information is used to determine a to-be-modified processing rule. Rule description information of the to-be-modified processing rule accords with the rule description match information, and the action instruction modification information is used to instruct to modify an action instruction specified in an instruction set of the to-be-modified processing rule. Therefore, for each first processing rule whose rule description information accords with the rule description match information, the forwarder modifies an action instruction specified in an instruction set of the first processing rule according to the action instruction modification information. Therefore, the forwarder no longer implements modification of the first processing rule only by using a manner similar to a manner in which an instruction set carried in a Flow_mod message is used to completely replace an original instruction set of a flow entry. Instead, the forwarder can separately modify a specified action and/or a specified action variable of the first processing rule. This manner of modifying the first processing rule is flexible, and increases efficiency in modifying the first processing rule in the forwarder by the controller. In addition, in a scenario in which only some action instructions need to be modified in the instruction set of the first processing rule, compared with the prior art, this manner can compete modification of the action instructions in the instruction set of the first processing rule by using relatively fewer messages. Compared with the prior art, this manner reduces a quantity of messages used for modifying the first processing rule, and therefore reduces occupied communication resources between the controller and the forwarder.

Figure 3:
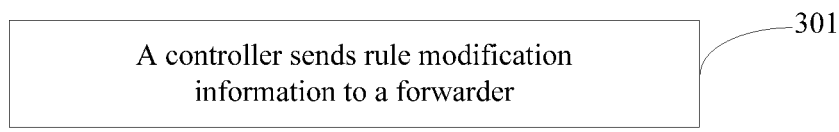
FIG. 3 is a schematic diagram of a second embodiment of a processing rule modification method.

Referring to FIG. 3, FIG. 3 is a schematic diagram of a second embodiment of a processing rule modification method. The method includes the following.

Step 301: A controller sends rule modification information to a forwarder, where the rule modification information includes rule description match information and action instruction modification information. The rule description match information is used to determine a to-be-modified processing rule. Rule description information of the to-be-modified processing rule accords with the rule description match information, and the action instruction modification information is used to instruct to modify an action instruction specified in an instruction set of the to-be-modified processing rule.

Therefore, when the forwarder determines that rule description information of a first processing rule accords with the rule description match information, the forwarder modifies an action instruction specified in an instruction set of the first processing rule according to the action instruction modification information.

Optionally, before step 301, the method may further include: generating, by the controller, the rule modification information.

Details about how the controller generates the rule modification information are not described herein.

In this embodiment, a controller sends rule modification information to a forwarder, where the rule modification information includes rule description match information and action instruction modification information. The rule description match information is used to determine a to-be-modified processing rule. Rule description information of the to-be-modified processing rule accords with the rule description match information, and the action instruction modification information is used to instruct to modify an action instruction specified in an instruction set of the to-be-modified processing rule. Therefore, for each first processing rule whose rule description information accords with the rule description match information, the forwarder modifies an action instruction specified in an instruction set of the first processing rule according to the action instruction modification information. Therefore, the forwarder no longer implements modification of the first processing rule only by using a manner similar to a manner in which an instruction set carried in a Flow_mod message is used to completely replace an original instruction set of a flow entry. Instead, the forwarder can separately modify a specified action and/or a specified action variable of the first processing rule. This manner of modifying the first processing rule is flexible, and increases efficiency in modifying the first processing rule in the forwarder by the controller. In addition, in a scenario in which only some action instructions need to be modified in the instruction set of the first processing rule, compared with the prior art, this manner can compete modification of the action instructions in the instruction set of the first processing rule by using relatively fewer messages. Compared with the prior art, this manner reduces a quantity of messages used for modifying the first processing rule, and therefore reduces occupied communication resources between the controller and the forwarder.

Figure 4:
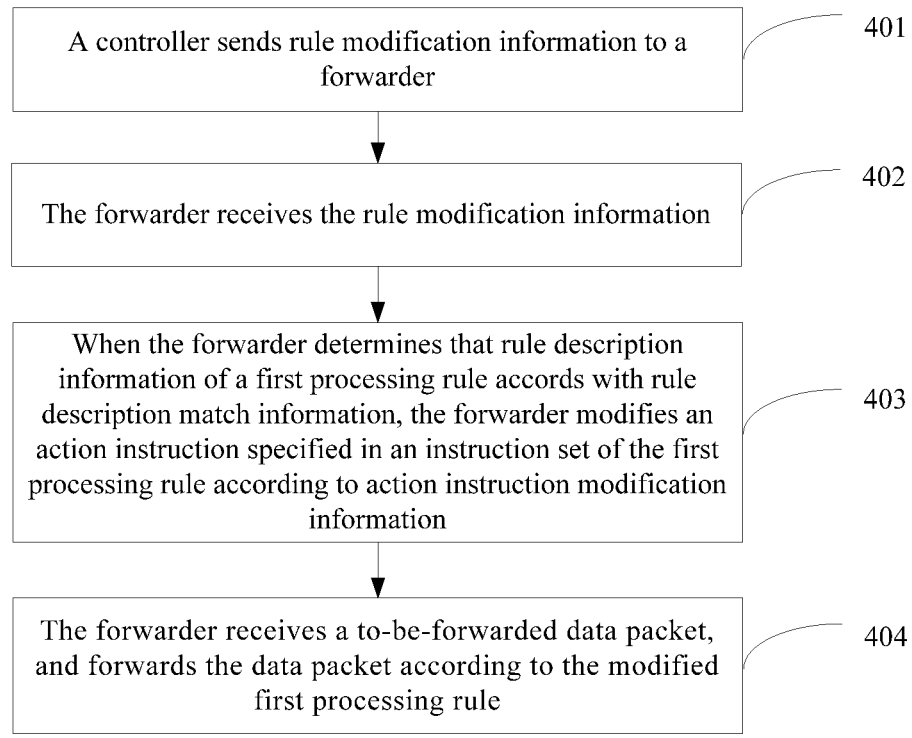
FIG. 4 is a schematic diagram of a third embodiment of a processing rule modification method.

Referring to FIG. 4, FIG. 4 is a schematic diagram of a third embodiment of a processing rule modification method. The method includes the following.

Step 401: A controller sends rule modification information to a forwarder, where the rule modification information includes rule description match information and action instruction modification information. The rule description match information is used to determine a to-be-modified processing rule. Rule description information of the to-be-modified processing rule accords with the rule description match information, and the action instruction modification information is used to instruct to modify an action instruction specified in an instruction set of the to-be-modified processing rule.

How the controller is triggered to modify a first processing rule, and how the controller determines which action instructions of the first processing rule need to be modified are not limited herein. For example, the controller may trigger modification of one or more first processing rules according to external conditions, such as reporting of a data packet by the forwarder, a rule modification request from an upper-layer management system of the controller, or a virtual machine migration notification, or according to internal conditions, such as a modification timer timeout. For example, the controller may extract, from a header field of the data packet reported by the forwarder, or obtain, from information directly input on the upper-layer management system, a first processing rule to be modified and a to-be-modified action instruction in each first processing rule. Alternatively, the controller determines a first processing rule to be modified, a to-be-modified action or action variable in each first processing rule, and the like according to information such as a type of a data packet forwarded by the forwarder, subscription information of a user to which the forwarded data packet belongs, and network status.

How to implement transmission of the rule modification information between the controller and the forwarder is not limited in the present disclosure. For example, in the OpenFlow protocol, this step may be implemented by using an OF controller to send, to an OF, a flow_mod message that carries the rule modification information. Alternatively, in another SDN network, this step may be implemented by using another message between the controller and the forwarder, and the like.

The rule description information is used to identify the first processing rule. For example, the rule description information may be a unique identifier that is allocated by the controller or the forwarder to the first processing rule. In some scenarios, for example in the OpenFlow protocol, the rule description information may be a match field of a flow entry. In this case, the rule description information may further be used to determine a data packet corresponding to the first processing rule, where the data packet corresponding to the first processing rule accords with the rule description information.

The rule description match information may have different implementations in different application scenarios.

Example 1

In the OpenFlow protocol, the rule description match information may be a match rule carried in a Flow_mod message. The match rule may cover different match field ranges and therefore indicate different flow entry sets according to whether the Flow_mod message carries a strict match modification identifier or a non-strict match modification identifier.

For example, the example in the Background section in which the match rule matches the match fields in the flow entries.

Alternatively, for example, a match rule carried in the Flow_mod message is: match rule={src_ip=ip1, dst_ip=ip2, protocol=ALL, port=ALL, tunnel_id=ALL}.

If the Flow_mod message carries the strict match modification identifier, a match field, in the forwarder, that is completely the same as the foregoing match rule is a range covered by the match rule. If the Flow_mod message carries the non-strict match modification identifier, a match field, in the forwarder, that includes the foregoing match rule is a range covered by the match rule.

Alternatively, for example, the match rule may use a wildcard of a Media Access Control (MAC)/Internet Protocol (IP)/Transmission Control Protocol (TCP)/User Datagram Protocol (UDP) header field, or a cookie mask, or other manners, so that the match rule can cover match fields of one or more flow entries. If the match rule is: match rule={src_ip=ip1, dst_ip=ip2, cookie=0x0031, cookie_mask=0xfffe}, the match rule may cover match fields of all flow entries in which a source IP address and a destination IP address are specified addresses, and that follow this logic: (flow entry:cookie&flow mod:cookie mask)==(Flow_mod:cookie&flow mod:cookie mask).

Example 2

It is assumed that the rule description information is implemented by using a processing rule identifier that uniquely identifies the first processing rule. The rule description match information may include one or more rule identifiers, for example, the rule description match information being {1, 3, 4}; or include a rule identifier mask, for example, the rule description match information being {0x001, mask=0xfffe}; or include a rule identifier range, for example, the rule description match information being {Min=1, MAX=3}; or the like.

In actual application, the rule description match information may be flexibly implemented, and may be set according to an actual application environment, which is not limited herein.

The action instruction modification information may include an action instruction match condition and modification operation information, where the action instruction match condition is used to determine a to-be-modified action instruction, and the modification operation information is used to indicate a modification operation on the to-be-modified action instruction.

Specifically, the action instruction match condition may include the following. Location information, where the location information is used to indicate a location of the to-be-modified action instruction in the instruction set of the to-be-modified processing rule; or instruction type information, where the instruction type information is used to indicate an instruction type of the to-be-modified action instruction; or the to-be-modified action instruction.

The location information may include a first mask, where a location of each mask bit in the first mask corresponds to a location of each action instruction in the instruction set of the to-be-modified processing rule. Or, the location information may include a modification indication list, where the modification indication list includes a modification indication, and a location of each modification indication in the modification indication list corresponds to a location of each action instruction in the instruction set of the to-be-modified processing rule, where the modification indication is used to indicate whether to modify the action instruction.

The modification operation information may include a new action instruction; or parameter modification indication information, where the parameter modification indication information is used to instruct to modify an action variable of the to-be-modified action instruction.

The parameter modification operation information may include a parameter match condition and parameter modification operation information, where the parameter match condition is used to determine the to-be-modified action variable in the to-be-modified action instruction, and the parameter modification operation information is used to instruct to modify the to-be-modified action variable.

The parameter match condition may include the to-be-modified action variable; or an action variable and a modification indication bound to the action variable, where the modification indication is used to indicate whether to modify the bound action variable.

The parameter modification operation information may include a new variable value, or operational method information, where the operational method information is used to indicate an operational method for obtaining a variable value.

An action variable of an action includes an action type and an action parameter. The action parameter may include one or more parameters.

Step 402: The forwarder receives the rule modification information.

Step 403: When the forwarder determines that rule description information of a first processing rule accords with the rule description match information, the forwarder modifies an action instruction specified in an instruction set of the first processing rule according to the action instruction modification information.

The following describes an implementation of this step in which the forwarder modifies the action instruction specified in the instruction set of the first processing rule according to the action instruction modification information.

The action instruction modification information may include an action instruction match condition and modification operation information, where the action instruction match condition is used to determine a to-be-modified action instruction, and the modification operation information is used to indicate a modification operation on the to-be-modified action instruction.

That the forwarder modifies an action instruction specified in an instruction set of the first processing rule according to the action instruction modification information may include determining, by the forwarder, a first action instruction to be modified in the instruction set of the first processing rule according to the action instruction match condition; and modifying, by the forwarder, the first action instruction according to the modification operation information.

The following exemplifies an implementation of the action instruction match condition.

1.1 The action instruction match condition may include location information, and the location information is used to indicate a location of the to-be-modified action instruction in the instruction set of the to-be-modified processing rule.

The determining, by the forwarder, a first action instruction to be modified in the instruction set of the first processing rule according to the action instruction match condition may include: determining, by the forwarder, the first action instruction according to the location information.

In a first possible implementation manner, the location information may include a first mask, where a location of each mask bit in the first mask corresponds to a location of each action instruction in the instruction set of the to-be-modified processing rule.

The determining, by the forwarder, the first action instruction according to the location information may include determining, by the forwarder, a mask bit being a preset value from the first mask; and determining, by the forwarder, the first action instruction according to a location of the mask bit being the preset value.

In actual application, a mask bit corresponding to the first action instruction is a first preset value, and values of other mask bits are different from the first preset value.

For example, in an example in which this embodiment is applicable to the OpenFlow protocol, a Flow_mod message sent by an OF controller to an OF forwarder is as follows: Flow_mod={MODIFY, table id=1, match rule, Mask=0x001, Instructions {action3}

The location information is implemented by using a mask 0x001. If the first preset value is 1, only the last mask bit of the mask 0x001 is 1, which indicates that the last action instruction in an instruction set of a flow entry is a first action instruction.

In a second possible implementation manner, the location information may include a modification indication list, where the modification indication list includes a modification indication, and a location of each modification indication in the modification indication list corresponds to a location of each action instruction in the instruction set of the to-be-modified processing rule, and the modification indication is used to indicate whether to modify the action instruction.

The determining, by the forwarder, the first action instruction according to the location information may include determining, by the forwarder, a modification indication that is used to indicate action instruction modification in the modification indication list, and determining, by the forwarder according to a first location of the modification indication that is used to indicate action instruction modification in the modification indication list, the first action instruction.

For example, in an example in which this embodiment is applicable to the OpenFlow protocol, a Flow_mod message sent by an OF controller to an OF forwarder is as follows: Flow_mod={MODIFY, table id=1, match rule, Instructions {(action1, 0), (action2, 1), (action3, 0)}}

An action 1, an action 2, and an action 3 carried in an instruction set of the Flow_mod message are modification operation information, specifically, new action instructions. This is not described herein but is described in detail in the following. 0 in (action1, 0) and (action3, 0), and 1 in (action2, 1) are modification indications. It is assumed that the modification indication 1 indicates modification of an action instruction corresponding to the modification indication, and the modification indication 0 indicates no modification of the action instruction corresponding to the modification indication. (action1, 0) is located at the first bit in the instruction set of the Flow_mod message, and (action1, 0) corresponds to a first action instruction in an instruction set of a flow entry. However, the forwarder does not modify the first action instruction in the instruction set of the flow entry because the modification indication is 0. Similarly, the forwarder modifies a second action instruction in the instruction set of the flow entry, but does not modify a third action instruction in the instruction set of the flow entry.

1.2 The action instruction match condition may include instruction type information, and the instruction type information is used to indicate an instruction type of the to-be-modified action instruction.

The determining, by the forwarder, a first action instruction to be modified in the instruction set of the first processing rule according to the action instruction match condition may include determining, by the forwarder, the first action instruction according to the instruction type information.

For example, in an example in which this embodiment is applicable to the OpenFlow protocol, a Flow_mod message sent by an OF controller to an OF forwarder is as follows Flow_mod={MODIFY, table id, match rule, Type_Only, Instructions {action3}}

An action 3 is modification operation information, specifically, a new action instruction. This is not described herein but is described in detail in the following. Type_Only is instruction type information and is used to indicate that an action type of a to-be-modified action instruction is the same as an action type of the modification operation information action 3. The forwarder determines an action instruction that is in an instruction table of a flow entry and whose action type is the same as the action type of the action 3 as the first action instruction.

1.3 The action instruction match condition may include: the to-be-modified action instruction.

The determining, by the forwarder, a first action instruction to be modified in the instruction set of the first processing rule according to the action instruction match condition may include determining, by the forwarder, the first action instruction from the instruction set of the first processing rule according to the action instruction included in the action instruction match condition.

For example, in an example in which this embodiment is applicable to the OpenFlow protocol, a Flow_mod message sent by an OF controller to an OF forwarder is as follows Flow_mod={MODIFY, table id, match rule, Instructions {(action1, action3), (action2, action4)}}

The former action instruction in each action instruction pair of action instruction pairs (action1, action3) and (action2, action4) is an action instruction match condition, and the latter action instruction is modification operation information. Specifically, the former action instructions action 1 and action 3 in the action instruction pairs (action1, action3) and (action2, action4) are to-be-modified action instructions. The forwarder separately determines an action 1 and an action 3 in an instruction set of a flow entry as a first action instruction.

Each action instruction in the foregoing example includes an action type and an action parameter. For example, the action 1 is an action of forwarding a data packet from a port 1, and the action 1 may be: action (type=OUTPUT, port=1). The foregoing description of this embodiment is irrelevant to a specific implementation of each action instruction, and therefore details are not provided herein.

The following exemplifies an implementation of the modification operation information.

2.1 The modification operation information may include a new action instruction.

The modifying, by the forwarder, the first action instruction according to the modification operation information may include changing, by the forwarder, the first action instruction to the new action instruction.

For example, in the foregoing examples shown in 1.2 and 1.3, the modification operation information is both implemented by using a new operation instruction.

If a Flow_mod message sent by an OF controller to an OF forwarder is as follows: Flow_mod={MODIFY, table id=1, match rule, Mask=0x001, Instructions {action3}, then modification operation information is carried in an instruction set of the Flow_mod message and is an action 3. The forwarder changes only a last action instruction in an instruction set of a flow entry to the new action instruction action 3 in the Flow_mod message, and retains other action instructions in the instruction set of the flow entry unchanged.

If a Flow_mod message sent by the OF controller to the OF forwarder is as follows: Flow_mod={MODIFY, table id=1, match rule, Instructions {(action1, 0), (action2, 1), (action3, 0)}}, where: an action 1, an action 2, and an action 3 carried in an instruction set of the Flow_mod message are modification operation information, specifically, new action instructions; 0 in (action1, 0) and (action3, 0), and 1 in (action2, 1) are modification indications; (action1, 0) is located at the first bit in the instruction set of the Flow_mod message and corresponds to a first action instruction in an instruction set of a flow entry; and the modification indication is 0; then the forwarder does not change the first action instruction in the instruction set of the flow entry to the action 1. Similarly, the forwarder changes a second action instruction in the instruction set of the flow entry to the action 2, but does not change a third action instruction in the instruction set of the flow entry to the action 3.

If a Flow_mod message sent by the OF controller to the OF forwarder is as follows: Flow_mod={MODIFY, table id, match rule, Type_Only, Instructions {action3}}, where an action 3 is modification operation information, specifically, a new action instruction, then the forwarder changes action instructions that are in an instruction table of a flow entry and whose action types are the same as the action type of the action 3 to the action 3, and retains other action instructions unchanged.

If a Flow_mod message sent by the OF controller to the OF forwarder is as follows: Flow_mod={MODIFY, table id, match rule, Instructions {(action1, action3), (action2, action4)}}, where the former action instruction in each action instruction pair of action instruction pairs (action1, action3) and (action2, action4) is an action instruction match condition, and the latter action instruction is modification operation information, specifically, the forwarder changes an action 1 in an instruction set of a flow entry to the action 3, changes an action 2 to the action 4, and retains other action instructions unchanged.

2.2 The modification operation information may include parameter modification indication information, and the parameter modification indication information is used to instruct to modify an action variable of the to-be-modified action instruction.

The modifying, by the forwarder, the first action instruction according to the modification operation information includes modifying, by the forwarder, an action variable of the first action instruction according to the parameter modification indication information.

The parameter modification indication information may include a parameter match condition and parameter modification operation information, where the parameter match condition is used to determine the to-be-modified action variable in the to-be-modified action instruction, and the parameter modification operation information is used to instruct to modify the to-be-modified action variable.

The modifying, by the forwarder, an action variable of the first action instruction according to the parameter modification indication information may include determining, by the forwarder, a first action variable to be modified in the first action instruction according to the parameter match condition; and modifying, by the forwarder, the first action variable according to the parameter modification operation information.

In a first possible implementation manner, the parameter match condition may include the to-be-modified action variable.

The determining, by the forwarder, a first action variable to be modified in the first action instruction according to the parameter match condition may include determining, by the forwarder, the first action variable to be modified in the first action instruction according to the action variable in the parameter match condition.

For example, in an example in which this embodiment is applicable to the OpenFlow protocol, a Flow_mod message sent by an OF controller to an OF forwarder is as follows Flow_mod={MODIFY, table id=1, match rule, Instructions [action1 (MBR=3 Mbps]}

An action parameter MBR is used as the parameter match condition.

In a second possible implementation manner, the parameter match condition may include an action variable and a modification indication bound to the action variable.

The determining, by the forwarder, a first action variable to be modified in the first action instruction according to the parameter match condition may include determining, by the forwarder, the first action variable to be modified in the first action instruction according to the action variable and the modification indication bound to the action variable.

For example, a Flow_mod message sent by the OF controller to the OF forwarder is as follows: Flow_mod={MODIFY, table id=1, match rule, Instructions [action1 ((MBR=3 Mbps, para_modify_ind=false), (GBR=iMbps, para_modify_ind=true)), action2 ((port=1, para_modify_ind=false))]}

Action parameters MBR and GBR and a modification indication para_modify_ind bound to them are used as the parameter match condition. It is assumed that para_modify_ind=false indicates no modification of an action variable, and para_modify_ind=true indicates modification of an action variable. The forwarder determines an action parameter GBR of an action 1 in an instruction table of a flow entry as the first action variable.

In a first possible implementation manner, the parameter modification operation information may include a new variable value.

The modifying, by the forwarder, the first action variable according to the parameter modification operation information may include changing, by the forwarder, a variable value of the first action variable to the new variable value.

For example, in an example in which this embodiment is applicable to the OpenFlow protocol, a Flow_mod message sent by the OF controller to the OF forwarder is as follows: Flow_mod={MODIFY, table id=1, match rule, Instructions [action1 (MBR=3 Mbps)]}

An action instruction action 1 is a first action instruction, an action variable MBR is a parameter match condition, and parameter modification operation information is a new variable value 3 Mbps. The forwarder changes an action parameter MBR of an action instruction action 1 in an instruction set of a flow entry to 3 Mbps.

In a second possible implementation manner, the parameter modification operation information may include operational method information, and the operational method information is used to indicate an operational method for obtaining a variable value.

The modifying, by the forwarder, the first action variable according to the parameter modification operation information may include obtaining, by the forwarder, a new variable value according to the operational method information; and changing, by the forwarder, a variable value of the first action variable to the new variable value.

For example, the operational method information may include a second mask and a target value corresponding to a to-be-modified variable bit. Each mask bit of the second mask corresponds to each variable bit of the variable value of the first action variable. A mask bit corresponding to the to-be-modified variable bit is a second preset value. Values of other mask bits are different from the second preset value.

The obtaining, by the forwarder, a new variable value according to the operational method information may include determining, by the forwarder, a variable bit of the variable value of the first action variable corresponding to the mask bit being the second preset value as the to-be-modified variable bit. The obtaining may also include modifying, by the forwarder, a value of the to-be-modified variable bit to the target value corresponding to the variable bit, to obtain a new variable value.

Example 1 in an example in which this embodiment is applicable to the OpenFlow protocol, a Flow_mod message sent by the OF controller to the OF forwarder is as follows: Flow_mod={MODIFY, table id=1, match rule, Instructions [action1 (type=PUSH_TUNNEL, tunnel_id=0xffff, mask=0x0000), action2 (type=OUTPUT, port=1, mask=0xfffe)]}

Second masks in operational method information are respectively mask=0x0000 in an action 1 and mask=0xfffe in an action 2. If a mask bit being 0 indicates modification of a corresponding variable bit, and a mask bit being 1 indicates no modification of a corresponding variable bit; then 0x0000 indicates modification of each variable bit, and 0xfffe indicates modification only of the last variable bit. The forwarder changes a parameter value of an action parameter tunnel_id of an action 1 in an instruction set of a flow entry to 0xffff, and changes the last parameter bit of a parameter value of an action parameter port of an action 2 to 1.

Example 2

ORIGIN_TUNNEL_ID indicates retaining of an original tunnel identifier (ORIGIN_TUNNEL_ID). DEC (ORGIN_PORT) indicates an operation of subtracting 1 from an original variable value of an original port number (ORGIN_PORT), where a result is used as a new variable value. INC(ORGIN_PORT) indicates an operation of adding 1 to an original variable value of an original port number, where a result is used as a new variable value. MUL (ORIGIN_GBR, 2) indicates an operation of multiplying an original variable value of original GBR(ORIGIN_GBR) by 2, where a result is used as a new variable value. DEC, INC, and MUL(variable, 2) are the operational method.

Step 404: The forwarder receives a to-be-forwarded data packet, and forwards the data packet according to the modified first processing rule.

Details about how the forwarder forwards the data packet according to the first processing rule are not described herein.

Optionally, in this embodiment, the forwarder may send modification result indication information to the controller according to a modification result of a specified action instruction. The modification result indication information may include indication information of a processing rule modification result and/or indication information of an action modification result. The indication information of a processing rule modification result may be used to indicate a modification result of the first processing rule. The indication information of an action modification result may be used to indicate a modification result of the specified action instruction.

For example, when the forwarder successfully modifies the specified action instruction according to the action instruction modification information, the indication information of a processing rule modification result may include a first success indication and rule description information of the first processing rule that is successfully modified; the indication information of an action modification result may include a second success indication and the action instruction that is successfully modified. Alternatively, when the forwarder unsuccessfully modifies a specified action variable according to the action instruction modification information, the indication information of a processing rule modification result may include a first failure indication and rule description information of the first processing rule that is unsuccessfully modified; action failure indication information may include a second failure indication and the action variable that is unsuccessfully modified. The first success indication and the second success indication may be the same or different. The first failure indication and the second failure indication may be the same or different.

In actual application, when the forwarder successfully modifies the specified action instruction according to the action instruction modification information, the forwarder may not report the modification result indication information. When the forwarder unsuccessfully modifies the specified action instruction according to the action instruction modification information, the forwarder reports the modification result indication information. The present disclosure sets no limit thereto.

In addition, the forwarder may send modification results of different first processing rules and/or different action instructions to the controller by using different modification result indication information, the forwarder may also send different modification results (success and failure) to the controller by using different modification result indication information, and the like. An implementation of the modification result indication information is not limited in the present disclosure. The modification result indication information may be flexibly implemented in actual application.

There may be many reasons why the specified action instruction is unsuccessfully modified. For example, when this embodiment is applicable to the OpenFlow protocol, an action in an instruction set of a flow entry may not match a quantity of actions in a Flow_mod message sent by an OF controller, or a specified action variable in a Flow_mod message and an action variable in an instruction set of a flow entry are in different formats, or an OF forwarder incorrectly performs an operation on a variable value of an action variable in an instruction set of a flow entry, for example, an operation result of a port number is a negative value, or an OF forwarder cannot perform an operation or modification on an action parameter of a flow entry, or the like.

When this embodiment is applicable to the OpenFlow protocol, the modification result indication information may be implemented by using an ACTION_PARA_ERROR message.

In this embodiment, a controller sends rule modification information to a forwarder, where the rule modification information includes rule description match information and action instruction modification information, where the rule description match information is used to determine a to-be-modified processing rule, rule description information of the to-be-modified processing rule accords with the rule description match information, and the action instruction modification information is used to instruct to modify an action instruction specified in an instruction set of the to-be-modified processing rule. Therefore, for each first processing rule whose rule description information accords with the rule description match information, the forwarder modifies an action instruction specified in an instruction set of the first processing rule according to the action instruction modification information. Therefore, the forwarder no longer implement modification of the first processing rule only by using a manner similar to a manner in which an instruction set carried in a Flow_mod message is used to completely replace an original instruction set of a flow entry. Instead, the forwarder can separately modify a specified action and/or a specified action variable of the first processing rule. This manner of modifying the first processing rule is flexible, and increases efficiency in modifying the first processing rule in the forwarder by the controller. In addition, in a scenario in which only some action instructions need to be modified in the instruction set of the first processing rule, compared with the prior art, this manner can compete modification of the action instructions in the instruction set of the first processing rule by using relatively fewer messages. Compared with the prior art, this manner reduces a quantity of messages used for modifying the first processing rule, and therefore reduces occupied communication resources between the controller and the forwarder.

Figure 5:
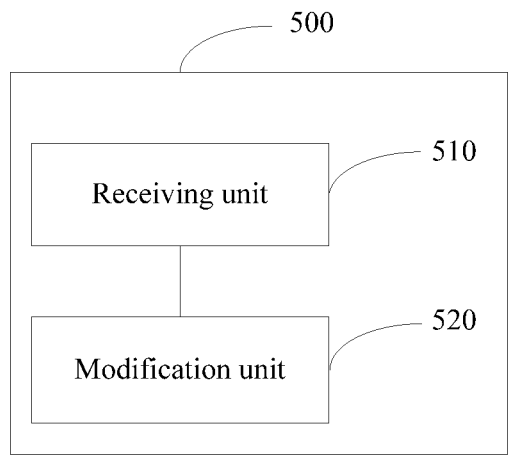
FIG. 5 is a schematic diagram of a first embodiment of a processing rule modification apparatus.

Referring to FIG. 5, FIG. 5 is a schematic diagram of a first embodiment of a processing rule modification apparatus 500. The apparatus may be applicable to a forwarder. The modification apparatus stores a first processing rule, where the first processing rule includes rule description information and an instruction set, the rule description information is used to identify the first processing rule, the instruction set includes at least one action instruction, and the instruction set is used to instruct to perform, according to the action instruction in the instruction set, processing on a data packet corresponding to the first processing rule. The apparatus 500 includes a receiving unit 510, configured to receive rule modification information sent by a controller. The rule modification information includes rule description match information and action instruction modification information. The rule description match information is used to determine a to-be-modified processing rule. Rule description information of the to-be-modified processing rule accords with the rule description match information. The action instruction modification information is used to instruct to modify an action instruction specified in an instruction set of the to-be-modified processing rule. The apparatus 500 also includes a modification unit 520, configured to modify an action instruction specified in the instruction set of the first processing rule according to the action instruction modification information received by the receiving unit 510 when it is determined that the rule description information of the first processing rule accords with the rule description match information received by the receiving unit 510.

Optionally, the action instruction modification information may include an action instruction match condition and modification operation information, where the action instruction match condition is used to determine a to-be-modified action instruction, and the modification operation information is used to indicate a modification operation on the to-be-modified action instruction.

The modification unit 520 may include an instruction determining subunit configured to determine a first action instruction to be modified in the instruction set of the first processing rule according to the action instruction match condition when it is determined that the rule description information of the first processing rule accords with the rule description match information received by the receiving unit. The modification unit 520 may further include a modification subunit, configured to modify the first action instruction according to the modification operation information.

Optionally, the action instruction match condition may include location information, and the location information is used to indicate a location of the to-be-modified action instruction in the instruction set of the to-be-modified processing rule.

The instruction determining subunit may be configured to determine the first action instruction according to the location information when it is determined that the rule description information of the first processing rule accords with the rule description match information received by the receiving unit.

Optionally, the location information may include a first mask, where a location of each mask bit in the first mask corresponds to a location of each action instruction in the instruction set of the to-be-modified processing rule.

The instruction determining subunit may be configured to determine a mask bit being a preset value from the first mask; and determine the first action instruction according to a location of the mask bit being the preset value when it is determined that the rule description information of the first processing rule accords with the rule description match information received by the receiving unit.

Optionally, the location information may include a modification indication list, where the modification indication list includes a modification indication, and a location of each modification indication in the modification indication list corresponds to a location of each action instruction in the instruction set of the to-be-modified processing rule, where the modification indication is used to indicate whether to modify the action instruction.

The instruction determining subunit may be configured to: when it is determined that the rule description information of the first processing rule accords with the rule description match information received by the receiving unit, determine a modification indication that is used to indicate action instruction modification, and determine, according to a first location of the modification indication that is used to indicate action instruction modification in the modification indication list, the first action instruction corresponding to the first location.

Optionally, the action instruction match condition may include: instruction type information, and the instruction type information is used to indicate an instruction type of the to-be-modified action instruction.

The instruction determining subunit may be configured to determine the first action instruction according to the instruction type information when it is determined that the rule description information of the first processing rule accords with the rule description match information received by the receiving unit.

Optionally, the modification operation information may include: a new action instruction.

The modification subunit may be configured to change the first action instruction to the new action instruction.

Optionally, the modification operation information may include parameter modification indication information, and the parameter modification indication information is used to instruct to modify an action variable of the to-be-modified action instruction.

The modification subunit may be configured to modify an action variable of the first action instruction according to the parameter modification indication information.

Optionally, the parameter modification indication information may include a parameter match condition and parameter modification operation information, where the parameter match condition is used to determine the to-be-modified action variable in the to-be-modified action instruction, and the parameter modification operation information is used to instruct to modify the to-be-modified action variable.

The modification subunit may include a determining module, configured to determine a first action variable to be modified in the first action instruction according to the parameter match condition; and a modification module, configured to modify the first action variable according to the parameter modification operation information.

Optionally, the parameter modification operation information may include a new variable value.

The modification module may be configured to change a variable value of the first action variable to the new variable value.

Optionally, the parameter modification operation information may include operational method information, and the operational method information is used to indicate an operational method for obtaining a variable value.

The modification module may be configured to obtain a new variable value according to the operational method information; and change a variable value of the first action variable to the new variable value.

Optionally, the receiving unit 510 may be configured to receive a flow modification Flow_mod message sent by the controller, where the Flow_mod message carries the rule modification information.

In this embodiment, a forwarder receives rule modification information sent by a controller, where the rule modification information includes rule description match information and action instruction modification information, where the rule description match information is used to determine a to-be-modified processing rule, rule description information of the to-be-modified processing rule accords with the rule description match information, and the action instruction modification information is used to instruct to modify an action instruction specified in an instruction set of the to-be-modified processing rule. Therefore, for each first processing rule whose rule description information accords with the rule description match information, the forwarder modifies an action instruction specified in an instruction set of the first processing rule according to the action instruction modification information. Therefore, the forwarder no longer implements modification of the first processing rule only by using a manner similar to a manner in which an instruction set carried in a Flow_mod message is used to completely replace an original instruction set of a flow entry. Instead, the forwarder can separately modify a specified action and/or a specified action variable of the first processing rule. This manner of modifying the first processing rule is flexible, and increases efficiency in modifying the first processing rule in the forwarder by the controller. In addition, in a scenario in which only some action instructions need to be modified in the instruction set of the first processing rule, compared with the prior art, this manner can compete modification of the action instructions in the instruction set of the first processing rule by using relatively fewer messages. Compared with the prior art, this manner reduces a quantity of messages used for modifying the first processing rule, and therefore reduces occupied communication resources between the controller and the forwarder.

Figure 6:
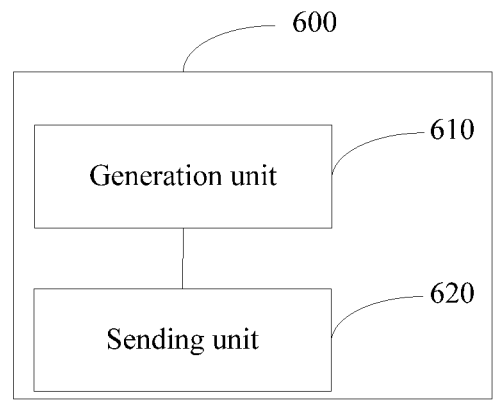
FIG. 6 is a schematic diagram of a second embodiment of a processing rule modification apparatus.

Referring to FIG. 6, FIG. 6 is a schematic diagram of a second embodiment of a processing rule modification apparatus 600. The apparatus is applicable to a controller that communicates with a forwarder. The forwarder stores a first processing rule, where the first processing rule includes rule description information and an instruction set, the rule description information is used to identify the first processing rule, the instruction set includes at least one action instruction, and the instruction set is used to instruct to perform, according to the action instruction in the instruction set, processing on a data packet corresponding to the first processing rule. The apparatus 600 includes a generation unit 610, configured to generate rule modification information; and a sending unit 620. The sending unit 620 is configured to send, to the forwarder, the rule modification information generated by the generation unit 610. The rule modification information includes rule description match information and action instruction modification information, where the rule description match information is used to determine a to-be-modified processing rule. Rule description information of the to-be-modified processing rule accords with the rule description match information, and the action instruction modification information is used to instruct to modify an action instruction specified in an instruction set of the to-be-modified processing rule, so that when the forwarder determines that the rule description information of the first processing rule accords with the rule description match information, the forwarder modifies an action instruction specified in the instruction set of the first processing rule according to the action instruction modification information.

Optionally, the sending unit 620 may be configured to send a flow modification Flow_mod message to the forwarder, where the Flow_mod message carries the rule modification information.

In this embodiment, a controller sends rule modification information to a forwarder, where the rule modification information includes rule description match information and action instruction modification information, where the rule description match information is used to determine a to-be-modified processing rule, rule description information of the to-be-modified processing rule accords with the rule description match information, and the action instruction modification information is used to instruct to modify an action instruction specified in an instruction set of the to-be-modified processing rule. Therefore, for each first processing rule whose rule description information accords with the rule description match information, the forwarder modifies an action instruction specified in an instruction set of the first processing rule according to the action instruction modification information. Therefore, the forwarder no longer implements modification of the first processing rule only by using a manner similar to a manner in which an instruction set carried in a Flow_mod message is used to completely replace an original instruction set of a flow entry. Instead, the forwarder can separately modify a specified action and/or a specified action variable of the first processing rule. This manner of modifying the first processing rule is flexible, and increases efficiency in modifying the first processing rule in the forwarder by the controller. In addition, in a scenario in which only some action instructions need to be modified in the instruction set of the first processing rule, compared with the prior art, this manner can compete modification of the action instructions in the instruction set of the first processing rule by using relatively fewer messages. Compared with the prior art, this manner reduces a quantity of messages used for modifying the first processing rule, and therefore reduces occupied communication resources between the controller and the forwarder.

Figure 7:
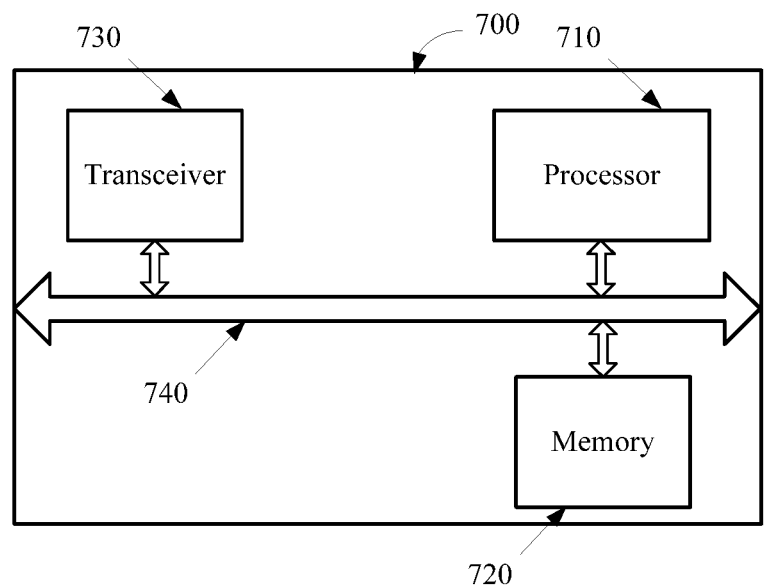
FIG. 7 is a schematic diagram of a structure of a forwarder.

Referring to FIG. 7, FIG. 7 is a schematic diagram of a structure of a forwarder 700. The forwarder 700 includes a processor 710, a memory 720, a transceiver 730, and a bus 740.

The processor 710, the memory 720, and the transceiver 730 are connected to each other by using the bus 740. The bus 740 may be an ISA bus, a PCI bus, an EISA bus, or the like. The bus may be classified into an address bus, a data bus, a control bus, and the like. For ease of presentation, the bus is indicated by using only one bold line in FIG. 7. However, it does not indicate that there is only one bus or only one type of bus.

The memory 720 is configured to store a program, and is further configured to store a first processing rule, where the first processing rule includes rule description information and an instruction set, the rule description information is used to identify the first processing rule, the instruction set includes at least one action instruction, and the instruction set is used to instruct to perform, according to the action instruction in the instruction set, processing on a data packet corresponding to the first processing rule. Specifically, the program may include program code, where the program code includes a computer operation instruction. The memory 720 may include a high-speed RAM, and may further include a non-volatile memory, for example, at least one magnetic disk memory.

The transceiver 730 is configured to connect other devices and communicate with the devices. The transceiver 730 is configured to receive rule modification information sent by a controller, where the rule modification information includes rule description match information and action instruction modification information, where the rule description match information is used to determine a to-be-modified processing rule, rule description information of the to-be-modified processing rule accords with the rule description match information, and the action instruction modification information is used to instruct to modify an action instruction specified in an instruction set of the to-be-modified processing rule.

The processor 710 executes the program code and is configured to: when it is determined that the rule description information of the first processing rule accords with the rule description match information received by the transceiver 730, modify, according to the action instruction modification information received by the transceiver 730, an action instruction specified in the instruction set of the first processing rule that is stored in the memory 720.

Optionally, the action instruction modification information may include an action instruction match condition and modification operation information, where the action instruction match condition is used to determine a to-be-modified action instruction, and the modification operation information is used to indicate a modification operation on the to-be-modified action instruction.

The processor 710 may be configured to determine a first action instruction to be modified in the instruction set of the first processing rule according to the action instruction match condition, and modify the first action instruction according to the modification operation information.

Optionally, the action instruction match condition may include location information, and the location information is used to indicate a location of the to-be-modified action instruction in the instruction set of the to-be-modified processing rule.

The processor 710 may be configured to determine the first action instruction according to the location information.

Optionally, the location information may include a first mask, where a location of each mask bit in the first mask corresponds to a location of each action instruction in the instruction set of the to-be-modified processing rule.

The processor 710 may be configured to determine a mask bit being a preset value from the first mask, and determine the first action instruction according to a location of the mask bit being the preset value.

Optionally, the location information may include a modification indication list, where the modification indication list includes a modification indication, and a location of each modification indication in the modification indication list corresponds to a location of each action instruction in the instruction set of the to-be-modified processing rule, and the modification indication is used to indicate whether to modify the action instruction.

The processor 710 may be configured to determine a modification indication that is used to indicate action instruction modification in the modification indication list, and determine, according to a first location of the modification indication that is used to indicate action instruction modification in the modification indication list, the first action instruction.

Optionally, the action instruction match condition may include: instruction type information, and the instruction type information is used to indicate an instruction type of the to-be-modified action instruction.

The processor 710 may be configured to determine the first action instruction according to the instruction type information.

Optionally, the modification operation information may include: a new action instruction.

The processor 710 may be configured to change the first action instruction to the new action instruction.

Optionally, the modification operation information may include parameter modification indication information, and the parameter modification indication information is used to instruct to modify an action variable of the to-be-modified action instruction.

The processor 710 may be configured to modify an action variable of the first action instruction according to the parameter modification indication information.

Optionally, the parameter modification indication information may include a parameter match condition and parameter modification operation information, where the parameter match condition is used to determine the to-be-modified action variable in the to-be-modified action instruction, and the parameter modification operation information is used to instruct to modify the to-be-modified action variable.

The processor 710 may be configured to determine a first action variable to be modified in the first action instruction according to the parameter match condition, and modify the first action variable according to the parameter modification operation information.

Optionally, the parameter modification operation information may include a new variable value.

The processor 710 may be configured to change a variable value of the first action variable to the new variable value.

Optionally, the parameter modification operation information may include operational method information, and the operational method information is used to indicate an operational method for obtaining a variable value.

The processor 710 may be configured to obtain a new variable value according to the operational method information, and change a variable value of the first action variable to the new variable value.

Optionally, the transceiver 730 may be configured to receive a flow modification Flow_mod message sent by the controller, where the Flow_mod message carries the rule modification information.

In this embodiment, a forwarder receives rule modification information sent by a controller, where the rule modification information includes rule description match information and action instruction modification information, where the rule description match information is used to determine a to-be-modified processing rule, rule description information of the to-be-modified processing rule accords with the rule description match information, and the action instruction modification information is used to instruct to modify an action instruction specified in an instruction set of the to-be-modified processing rule. Therefore, for each first processing rule whose rule description information accords with the rule description match information, the forwarder modifies an action instruction specified in an instruction set of the first processing rule according to the action instruction modification information. Therefore, the forwarder no longer implements modification of the first processing rule only by using a manner similar to a manner in which an instruction set carried in a Flow_mod message is used to completely replace an original instruction set of a flow entry. Instead, the forwarder can separately modify a specified action and/or a specified action variable of the first processing rule. This manner of modifying the first processing rule is flexible, and increases efficiency in modifying the first processing rule in the forwarder by the controller. In addition, in a scenario in which only some action instructions need to be modified in the instruction set of the first processing rule, compared with the prior art, this manner can compete modification of the action instructions in the instruction set of the first processing rule by using relatively fewer messages. Compared with the prior art, this manner reduces a quantity of messages used for modifying the first processing rule, and therefore reduces occupied communication resources between the controller and the forwarder.

Figure 8:
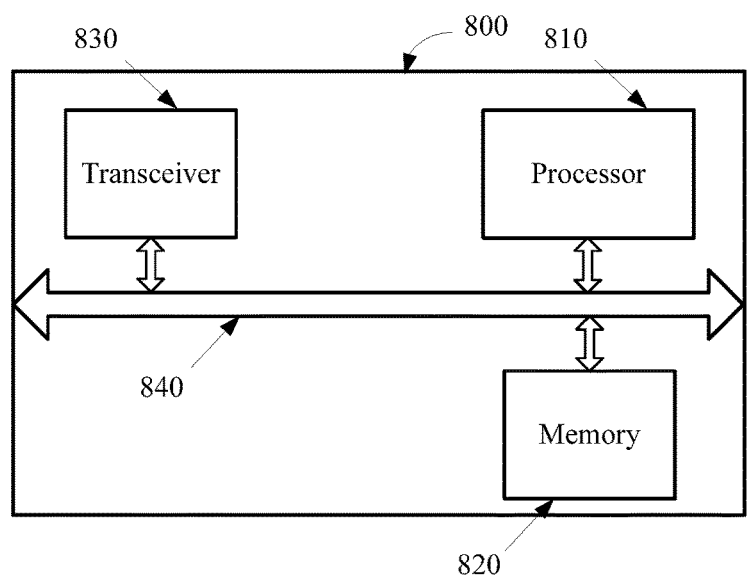
FIG. 8 is a schematic diagram of a structure of a controller.

Referring to FIG. 8, FIG. 8 is a schematic diagram of a structure of a controller 800. The controller 800 includes a processor 810, a memory 820, a transceiver 830, and a bus 840.

The processor 810, the memory 820, and the transceiver 830 are connected to each other by using the bus 840. The bus 840 may be an ISA bus, a PCI bus, an EISA bus, or the like. The bus may be classified into an address bus, a data bus, a control bus, and the like. For ease of presentation, the bus is indicated by using only one bold line in FIG. 8. However, it does not indicate that there is only one bus or only one type of bus.

The memory 820 is configured to store a program. Specifically, the program may include program code, where the program code includes a computer operation instruction. The memory 820 may include a high-speed RAM, and may further include a non-volatile memory, for example, at least one magnetic disk memory.

The processor 810 is configured to execute the program code.

The transceiver 830 is configured to connect other devices and communicate with the devices. The transceiver 830 is configured to send rule modification information to a forwarder, where the rule modification information includes rule description match information and action instruction modification information, where the rule description match information is used to determine a to-be-modified processing rule, rule description information of the to-be-modified processing rule accords with the rule description match information, and the action instruction modification information is used to instruct to modify an action instruction specified in an instruction set of the to-be-modified processing rule, so that when the forwarder determines that rule description information of a first processing rule accords with the rule description match information, the forwarder modifies an action instruction specified in an instruction set of the first processing rule according to the action instruction modification information.

The forwarder stores the first processing rule, where the first processing rule includes the rule description information and the instruction set, the rule description information is used to identify the first processing rule, the instruction set includes at least one action instruction, and the instruction set is used to instruct to perform, according to the action instruction in the instruction set, processing on a data packet corresponding to the first processing rule.

Optionally, the transceiver 830 may be configured to send a Flow_mod message to the forwarder, where the Flow_mod message carries the rule modification information.

Optionally, the processor 810 may be further configured to generate the rule modification information and send the generated rule modification information to the transceiver 830.

In this embodiment, a controller sends rule modification information to a forwarder, where the rule modification information includes rule description match information and action instruction modification information, where the rule description match information is used to determine a to-be-modified processing rule, rule description information of the to-be-modified processing rule accords with the rule description match information, and the action instruction modification information is used to instruct to modify an action instruction specified in an instruction set of the to-be-modified processing rule. Therefore, for each first processing rule whose rule description information accords with the rule description match information, the forwarder modifies an action instruction specified in an instruction set of the first processing rule according to the action instruction modification information. Therefore, the forwarder no longer implements modification of the first processing rule only by using a manner similar to a manner in which an instruction set carried in a Flow_mod message is used to completely replace an original instruction set of a flow entry. Instead, the forwarder can separately modify a specified action and/or a specified action variable of the first processing rule. This manner of modifying the first processing rule is flexible, and increases efficiency in modifying the first processing rule in the forwarder by the controller. In addition, in a scenario in which only some action instructions need to be modified in the instruction set of the first processing rule, compared with the prior art, this manner can compete modification of the action instructions in the instruction set of the first processing rule by using relatively fewer messages. Compared with the prior art, this manner reduces a quantity of messages used for modifying the first processing rule, and therefore reduces occupied communication resources between the controller and the forwarder.

A person skilled in the art may clearly understand that, the technologies in the embodiments may be implemented by software in addition to a necessary general hardware platform. Based on such an understanding, the technical solutions of the present disclosure essentially or the part contributing to the prior art may be implemented in a form of a software product. The software product is stored in a storage medium, such as a ROM/RAM, a magnetic disk, or an optical disc, and includes several instructions for instructing a computer device (which may be a personal computer, a server, or a network device) to perform the methods described in the embodiments or some parts of the embodiments.

The embodiments in this specification are all described in a progressive manner, for same or similar parts in the embodiments, reference may be made to these embodiments, and each embodiment focuses on a difference from other embodiments. Especially, a system embodiment is basically similar to a method embodiment, and therefore is described briefly; for related parts, reference may be made to partial descriptions in the method embodiment.

The foregoing descriptions are implementation manners of the present disclosure, but are not intended to limit the protection scope of the present disclosure. Any modification, equivalent replacement, and improvement made without departing from the principle of the present disclosure shall fall within the protection scope of the present disclosure.

What is claimed is:

1. An apparatus, comprising:
   a computer-readable storage medium storing:
     a first processing rule, wherein the first processing rule comprises rule description information and an instruction set, wherein the rule description information is used to identify the first processing rule, wherein the instruction set comprises at least one action instruction, and wherein the instruction set is used to instruct to perform, according to the action instruction in the instruction set, processing on a data packet corresponding to the first processing rule;
     a receiver configured to receive rule modification information sent by a controller, wherein the rule modification information comprises rule description match information and action instruction modification information, wherein the rule description match information is used to determine a to-be-modified processing rule, rule description information of the to-be-modified processing rule accords with the rule description match information, and the action instruction modification information is used to instruct to modify an action instruction specified in an instruction set of the to-be-modified processing rule; and
   a processor, wherein the computer-readable storage medium stores a program to be executed by the processor, the program including instructions for:
     modifying an action instruction specified in the instruction set of the first processing rule according to the action instruction modification information in response to a determination that the rule description information of the first processing rule accords with the rule description match information.

2. The apparatus according to claim 1, wherein the action instruction modification information comprises an action instruction match condition and modification operation information, wherein the action instruction match condition is used to determine a to-be-modified action instruction, wherein the modification operation information is used to indicate a modification operation on the to-be-modified action instruction, and wherein the program includes instructions for:
   determining a first action instruction to be modified in the instruction set of the first processing rule according to the action instruction match condition in response to a determination that the rule description information of the first processing rule accords with the rule description match information; and
   modifying the first action instruction according to the modification operation information.

3. The apparatus according to claim 2, wherein the action instruction match condition comprises location information, and the location information is used to indicate a location of the to-be-modified action instruction in the instruction set of the to-be-modified processing rule, and wherein the program includes instructions for:
   determining the first action instruction according to the location information in response to a determination that the rule description information of the first processing rule accords with the rule description match information.

4. The apparatus according to claim 3, wherein the location information comprises a first mask, and a location of each mask bit in the first mask corresponds to a location of each action instruction in the instruction set of the to-be-modified processing rule, and wherein the program includes instructions for:

determining a mask bit being a preset value from the first mask in response to a determination that the rule description information of the first processing rule accords with the rule description match information; and determining the first action instruction according to a location of the mask bit being the preset value.

5. The apparatus according to claim 3, wherein the location information comprises a modification indication list, the modification indication list comprises a modification indication, and a location of each modification indication in the modification indication list corresponds to a location of each action instruction in the instruction set of the to-be-modified processing rule, wherein the modification indication is used to indicate whether to modify the action instruction, and wherein the program includes instructions for:

determining a modification indication that is used to indicate action instruction modification in response to a determination that the rule description information of the first processing rule accords with the rule description match information; and determining, according to a first location of the modification indication that is used to indicate action instruction modification in the modification indication list, the first action instruction corresponding to the first location.

6. The apparatus according to claim 2, wherein the action instruction match condition comprises instruction type information, and the instruction type information is used to indicate an instruction type of the to-be-modified action instruction, and wherein the program includes instructions for:

determining the first action instruction according to the instruction type information in response to a determination that the rule description information of the first processing rule accords with the rule description match information.

7. The apparatus according to claim 2, wherein the modification operation information comprises a new action instruction, and wherein the program includes instructions for changing the first action instruction to the new action instruction.

8. The apparatus according to claim 2, wherein the modification operation information comprises parameter modification indication information, and the parameter modification indication information is used to instruct to modify an action variable of the to-be-modified action instruction, and wherein the program includes instructions for modifying an action variable of the first action instruction according to the parameter modification indication information.

9. An apparatus, wherein the apparatus is applicable to a controller that communicates with a forwarder, wherein the forwarder stores a first processing rule, the first processing rule comprises rule description information and an instruction set, the rule description information is used to identify the first processing rule, the instruction set comprises at least one action instruction, the instruction set is used to instruct to perform, according to the action instruction in the instruction set, processing on a data packet corresponding to the first processing rule, the apparatus comprising:

a processor configured to generate rule modification information; and a sender configured to send, to the forwarder, the rule modification information, wherein the rule modification information comprises rule description match information and action instruction modification information, wherein the rule description match information is used to determine a to-be-modified processing rule, rule description information of the to-be-modified processing rule accords with the rule description match information, and the action instruction modification information is used to instruct to modify an action instruction specified in an instruction set of the to-be-modified processing rule.

10. The apparatus according to claim 9, wherein the sender is configured to send a flow modification Flow_mod message to the forwarder, wherein the Flow_mod message carries the rule modification information.

11. A method, applicable to a forwarder, comprising:

storing, by the forwarder, a first processing rule comprising rule description information and an instruction set, wherein the rule description information is used to identify the first processing rule, the instruction set comprising at least one action instruction, the instruction set being used to instruct to perform, according to the action instruction in the instruction set, processing on a data packet corresponding to the first processing rule;

receiving, by the forwarder, rule modification information sent by a controller, wherein the rule modification information comprises rule description match information and action instruction modification information, wherein the rule description match information is used to determine a to-be-modified processing rule, rule description information of the to-be-modified processing rule accords with the rule description match information, and the action instruction modification information is used to instruct to modify an action instruction specified in an instruction set of the to-be-modified processing rule; and modifying, by the forwarder, an action instruction specified in the instruction set of the first processing rule according to the action instruction modification information in response to a determination, by the forwarder, that the rule description information of the first processing rule accords with the rule description match information.

12. The method according to claim 11, wherein the action instruction modification information comprises an action instruction match condition and modification operation information, wherein the action instruction match condition is used to determine a to-be-modified action instruction, and the modification operation information is used to indicate a modification operation on the to-be-modified action instruction, and wherein the modifying comprises:

determining, by the forwarder, a first action instruction to be modified in the instruction set of the first processing rule according to the action instruction match condition; and modifying, by the forwarder, the first action instruction according to the modification operation information.

13. The method according to claim 12, wherein the action instruction match condition comprises location information, and the location information is used to indicate a location of the to-be-modified action instruction in the instruction set of the to-be-modified processing rule, and wherein the determining, by the forwarder, a first action instruction to be modified in the instruction set of the first processing rule according to the action instruction match condition comprises:
  determining, by the forwarder, the first action instruction according to the location information.

14. The method according to claim 13, wherein the location information comprises a first mask, and a location of each mask bit in the first mask corresponds to a location of each action instruction in the instruction set of the to-be-modified processing rule, and wherein the determining, by the forwarder, the first action instruction according to the location information comprises:
  determining, by the forwarder, a mask bit being a preset value from the first mask; and
  determining, by the forwarder, the first action instruction according to a location of the mask bit being the preset value.

15. The method according to claim 13, wherein the location information comprises a modification indication list, the modification indication list comprises a modification indication, and a location of each modification indication in the modification indication list corresponds to a location of each action instruction in the instruction set of the to-be-modified processing rule, wherein the modification indication is used to indicate whether to modify the action instruction, and wherein the determining, by the forwarder, the first action instruction according to the location information comprises:
  determining, by the forwarder, a modification indication that is used to indicate action instruction modification in the modification indication list, and determining, by the forwarder according to a first location of the modification indication that is used to indicate action instruction modification in the modification indication list, the first action instruction.

16. The method according to claim 12, wherein the action instruction match condition comprises instruction type information, and the instruction type information is used to indicate an instruction type of the to-be-modified action instruction, and wherein the determining, by the forwarder, a first action instruction to be modified in the instruction set of the first processing rule according to the action instruction match condition comprises:
  determining, by the forwarder, the first action instruction according to the instruction type information.

17. The method according to claim 12, wherein the modification operation information comprises a new action instruction, and wherein the modifying, by the forwarder, the first action instruction according to the modification operation information comprises:
  changing, by the forwarder, the first action instruction to the new action instruction.

18. The method according to claim 12, wherein the modification operation information comprises parameter modification indication information, and the parameter modification indication information is used to instruct to modify an action variable of the to-be-modified action instruction, and wherein the modifying, by the forwarder, the first action instruction according to the modification operation information comprises:
  modifying, by the forwarder, an action variable of the first action instruction according to the parameter modification indication information.

19. A method, applicable to a controller that communicates with a forwarder, comprising:
  storing, by the forwarder, a first processing rule comprising rule description information and an instruction set, the rule description information being used to identify the first processing rule, the instruction set comprising at least one action instruction, the instruction set being used to instruct to perform, according to the action instruction in the instruction set, processing on a data packet corresponding to the first processing rule;
  sending, by the controller to the forwarder, rule modification information, wherein the rule modification information comprises rule description match information and action instruction modification information, wherein the rule description match information is used to determine a to-be-modified processing rule, rule description information of the to-be-modified processing rule accords with the rule description match information, and the action instruction modification information is used to instruct to modify an action instruction specified in an instruction set of the to-be-modified processing rule; and
  modifying, by the forwarder, an action instruction specified in the instruction set of the first processing rule according to the action instruction modification information in response to a determination, by the forwarder, that the rule description information of the first processing rule accords with the rule description match information.

20. The method according to claim 19, wherein the sending, by the controller to the forwarder, rule modification information comprises:
  sending, by the controller to the forwarder, a flow modification Flow_mod message, wherein the Flow_mod message carries the rule modification information.

* * * * *